UNITED STATES PATENT OFFICE.

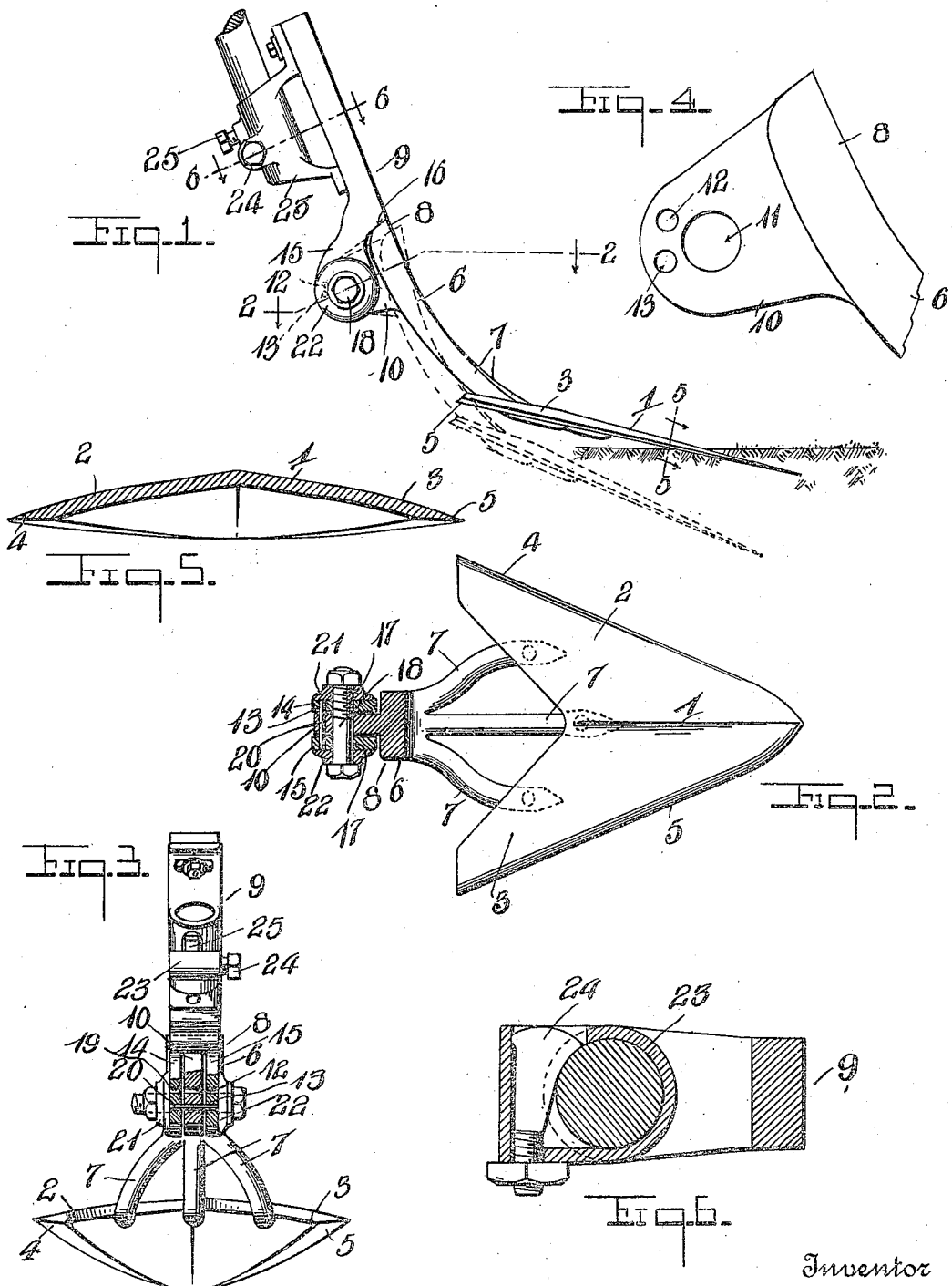

FREDRICK A. PENDARVIS, OF VILLISCA, IOWA.

CULTIVATOR-SHOVEL.

961,640.  Specification of Letters Patent.  Patented June 14, 1910.

Application filed June 21, 1909. Serial No. 503,527.

*To all whom it may concern:*

Be it known that I, FREDRICK A. PENDARVIS, a citizen of the United States, residing at Villisca, in the county of Montgomery and State of Iowa, have invented certain new and useful Improvements in Cultivator-Shovels; and I do declare the following to be a full, clear, and exact description of the invention, such as will enable others skilled in the art to which it appertains to make and use the same.

This invention relates to an improved cultivator shovel.

The object of the invention is to provide a simply constructed and efficient shovel which may be quickly and accurately adjusted for either deep or shallow cultivation and which is provided with simple, strong and readily adjusted means for fastening it to the shank or standard of the cultivator.

Another object of the invention is to provide means for holding the shovel in position should the attaching bolt become loose.

With these and other objects in view, the invention consists of certain novel features of construction, combination and arrangement of parts as will be more fully described and particularly pointed out in the appended claim.

In the accompanying drawings; Figure 1 is a side elevation of this improved shovel showing the blade arranged for shallow cultivation in full lines and for deep cultivation in dotted lines; Fig. 2 is a horizontal section taken on the line 2—2 of Fig. 1; and, Fig. 3 is a rear elevation partly in section: Fig. 4 is a detail side elevation; Fig. 5 is a horizontal section taken on line 5—5 of Fig. 1; Fig. 6 is a similar view on the line 6—6 of Fig. 1.

In the embodiment illustrated a blade 1 is shown preferably provided with two sides or wings 2 and 3 formed in one piece and arranged to give the blade a V-shape the apex being at the front. The outer edges of the wings 2 and 3 are provided with cutting edges 4 and 5. This blade is mounted on a shank 6 the lower end of which is provided with three fingers or branches as 7 the side fingers being riveted to the wings 2 and 3 and the central finger to the center of the blade 1 said fingers extending under and engaging the lower face of said blade. This shank 6 is made as shown in two sections 8 and 9 the lower section 8 being provided with the fingers above described and detachably and adjustably connected with the upper section 9 and is preferably constructed as shown the lower section 8 having a lug or ear 10 extending laterally from the rear face thereof near its upper end and made of a suitable thickness to withstand the strain to which it is subjected. This ear is provided with a bolt hole 11 and with two vertically spaced apertures 12 and 13 to receive the pin hereinafter described.

The upper section 9 is bifurcated at its lower end to provide two laterally spaced ears or lugs 14 and 15 to receive between them the ear 10 of the section 8. These ears 14 and 15 are offset from the front face of the section 9 to form a shoulder 16 which is adapted to engage the upper end of the section 8 when the blade is arranged in normal position for shallow cultivating as is shown clearly in Fig. 1. These ears 14 and 15 are provided with registering bolt holes as 17 which also are designed to register with the bolt hole 11 in the ear 10 of the section 8 to receive the fastening bolt 18 for securing the sections together. Apertures as 19 are also provided in the ears 14 and 15 and are arranged to register with each other and with one of the apertures 12 or 13 in the ear 10 to provide for the adjustment of the blade for shallow or deep plowing. When the blade is adjusted for shallow plowing as shown in full lines in Fig. 1 the apertures 19 register with the uppermost aperture 12 in the ear 10 and when the blade is adjusted for deep cultivation said apertures 19 are designed to register with the lower aperture 13 in the ear 10. A headless pin 20 is adapted to pass through one of the apertures 19 in the ears 12 and 13 and through the registering aperture in the ear 10 to assist in holding the shank sections in adjusted position and to prevent them from separating should the bolt 18 work loose. Washers 21 and 22 are arranged on opposite ends of the bolt 18 and lap over the opposite ends of the pin 20 to prevent its slipping out of said apertures.

The section 9 is provided on its rear face with a socket member 23 opening longitudinally of the shank to provide for the reception of the cultivator shank or standard to which the shovel is to be attached. This socket is provided with a transversely adjustable approximately wedge-shaped bolt member 24 to adapt it for connection with cultivator shanks of different sizes and shapes. A set screw 25 is also preferably provided to engage the shank of the cultivator to assist in holding the socket 23 firmly connected therewith.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention—

A cultivator shovel having a shank composed of two sections one of said sections having its meeting end bifurcated and provided with registering bolt holes and the other section having a laterally extending lug adapted to extend between the arms of the bifurcated section and having a bolt hole adapted to register with the bolt holes in said arms, a bolt adapted to extend through said holes for adjustably connecting said sections, said arms and lug being provided with registering apertures at the rear of said bolt holes and a pin adapted to extend through said apertures to assist in holding the sections in adjusted position, washers arranged on opposite ends of said bolt and extending over the ends of the pin to prevent accidental disengagement thereof.

In testimony whereof I have hereunto set my hand in presence of two subscribing witnesses.

FREDRICK A. PENDARVIS.

Witnesses:
L. E. WICKERSHAM,
W. B. WOODWARD.